United States Defensive Publication [19] (H) [11] T966,003

Maskasky [43] Jan. 3, 1978

[54] PHOTOGRAPHIC ELEMENTS CONTAINING VAPOR DEPOSITED SILVER HALIDE LAYERS

[76] Inventor: Joe E. Maskasky, c/o Kodak Park Division, Rochester, N.Y. 14650

[21] Appl. No.: 766,290

[22] Filed: Feb. 7, 1977

[51] Int. Cl.[2] ..... G03C 1/02

[52] U.S. Cl. ..... 96/94 BF

[57] ABSTRACT

A photographic element is disclosed comprised of a support and at least two contiguous vacuum vapor deposited silver halide layers. One of the layers is a vacuum vapor deposited silver iodide layer. A second, contiguous layer is a vacuum vapor deposited silver chloride layer.

6 Claims, No Sheets Drawing,

15 Pages Specification

The file of this unexamined application may be inspected and copies thereof may be purchased (849 O.G. 1221, Apr. 9, 1968).